United States Patent
Turner et al.

(10) Patent No.: US 9,042,636 B2
(45) Date of Patent: May 26, 2015

(54) APPARATUS AND METHOD FOR INDICATING DEPTH OF ONE OR MORE PIXELS OF A STEREOSCOPIC 3-D IMAGE COMPRISED FROM A PLURALITY OF 2-D LAYERS

(75) Inventors: Tara Handy Turner, Marina Del Rey, CA (US); Evan M. Goldberg, Los Angeles, CA (US); Matthew F. Schnittker, Castaic, CA (US); Joseph W. Longson, Castaic, CA (US); Robert M. Neuman, Santa Clarita, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 378 days.

(21) Appl. No.: 12/650,687

(22) Filed: Dec. 31, 2009

(65) Prior Publication Data

US 2011/0158504 A1    Jun. 30, 2011

(51) Int. Cl.
*G06K 9/00* (2006.01)
*H04N 13/02* (2006.01)

(52) U.S. Cl.
CPC ................... *H04N 13/026* (2013.01)

(58) Field of Classification Search
CPC ............. G06T 2207/10016; G06T 7/0012; G06T 2207/10081; G06K 9/3241
USPC ............ 382/154, 103, 131; 345/419; 715/781
See application file for complete search history.

(56) References Cited

U.S. PATENT DOCUMENTS

| | | | |
|---|---|---|---|
| 4,925,294 A | 5/1990 | Geshwind et al. | |
| 5,499,323 A | 3/1996 | Doi et al. | |
| 5,510,832 A | 4/1996 | Garcia | |
| 6,208,348 B1 | 3/2001 | Kaye | |
| 6,515,659 B1 | 2/2003 | Kaye | |
| 6,590,573 B1 | 7/2003 | Geshwind | |
| 6,664,961 B2 | 12/2003 | Ray et al. | |
| 6,686,926 B1 | 2/2004 | Kaye | |

(Continued)

FOREIGN PATENT DOCUMENTS

| | | |
|---|---|---|
| WO | 2004/021151 | 3/2004 |
| WO | 2008/060289 A1 | 5/2008 |

OTHER PUBLICATIONS

Battiato et al, "3D stereoscopic image pairs by depth-map generation", Proceedings of the 2nd International Symposium on 3D Data Processing, Visualization, and Transmission (3DPVT'04), IEEE, 2004.*

(Continued)

*Primary Examiner* — Ruiping Li
(74) *Attorney, Agent, or Firm* — Dorsey & Whitney LLP

(57) ABSTRACT

Implementations of the present invention involve methods and systems for converting a 2-D image to a stereoscopic 3-D image and displaying the depth of one or more pixels of the 3-D image through an output image of a user interface. The pixels of the output image display the perceived depth of the corresponding 3-D image such that the user may determine the relative depth of the pixels of the image. In addition, one or more x-offset values or z-axis positions may be individually selected such that any pixel of the output image that correspond to the selected values is indicated in the output image. By providing the user with a visualization tool to quickly determine the perceived position of any pixel of a stereoscopic image, the user may confirm the proper alignment of the objects of the image in relation to the image as a whole.

19 Claims, 10 Drawing Sheets

(56) References Cited

U.S. PATENT DOCUMENTS

| | | |
|---|---|---|
| 7,082,223 B1 | 7/2006 | Harris |
| 7,102,633 B2 | 9/2006 | Kaye |
| 7,116,323 B2 | 10/2006 | Kaye |
| 7,116,324 B2 | 10/2006 | Kaye |
| 7,254,265 B2 | 8/2007 | Naske et al. |
| 7,256,779 B2 | 8/2007 | Donnelly |
| 7,573,475 B2 | 8/2009 | Sullivan et al. |
| 7,639,838 B2 * | 12/2009 | Nims .......................... 382/103 |
| 7,925,078 B2 | 4/2011 | Rhodes |
| 8,351,689 B2 | 1/2013 | Turner et al. |
| 8,411,931 B2 | 4/2013 | Zhou et al. |
| 8,502,862 B2 | 8/2013 | Turner et al. |
| 2002/0118275 A1 | 8/2002 | Harman |
| 2002/0186216 A1 | 12/2002 | Baumberg et al. |
| 2003/0007681 A1 | 1/2003 | Baker |
| 2004/0015424 A1 | 1/2004 | Cash et al. |
| 2004/0135780 A1 | 7/2004 | Nims |
| 2004/0222988 A1 | 11/2004 | Donnelly |
| 2005/0254702 A1 | 11/2005 | Era |
| 2006/0026527 A1 | 2/2006 | Bells |
| 2006/0184279 A1 | 8/2006 | Okamoto et al. |
| 2007/0279415 A1 | 12/2007 | Sullivan et al. |
| 2008/0247670 A1 | 10/2008 | Tam et al. |
| 2009/0195643 A1 | 8/2009 | Neuman |
| 2009/0196492 A1 | 8/2009 | Jung et al. |
| 2009/0219283 A1 | 9/2009 | Hendrickson et al. |
| 2009/0219383 A1 | 9/2009 | Passmore |
| 2009/0262184 A1 | 10/2009 | Engle et al. |
| 2009/0322860 A1 | 12/2009 | Zhang et al. |
| 2010/0073364 A1 | 3/2010 | Jung et al. |
| 2010/0080448 A1 | 4/2010 | Tam et al. |
| 2010/0265248 A1 | 10/2010 | McCrae et al. |
| 2011/0050687 A1 | 3/2011 | Alyshev et al. |
| 2011/0050864 A1 | 3/2011 | Bond |
| 2011/0074778 A1 | 3/2011 | Turner et al. |
| 2011/0074784 A1 | 3/2011 | Turner et al. |
| 2011/0210969 A1 | 9/2011 | Barenbrug |
| 2011/0304691 A1 | 12/2011 | Newton et al. |
| 2012/0099836 A1 | 4/2012 | Welsh et al. |

OTHER PUBLICATIONS

Johnston, Scott F., "Non-Photorealistic Animation and Rendering," Proceedings of the $2^{nd}$ International Symposium on Non-Photorealistic Animation and Rendering, Annecy, France, pp. 45-ff, 2002.

Petrovic et al., "Shadows for Cel Animation," Proceedings of SIGGRAPH2000, pp. 511-516, 2000.

European Search Report, "EP 10179710.8; Method and System for Creating Depth and Volume in a 2-D Planar Image", 7 pages.

Tam, et al., "3D-TV Content Generation: 2D-to-3D Conversion", 2006 IEEE International Conference on Multimedia and Expo (Jul. 12, 2006), 1869-1872.

Brimelow, Lee, "New tutorial on parallax 3D effects", http://www.leebrimelow.com/new-tutorial-on-parallax-3d-effects/. Published on Dec. 5, 2008, 9 pages.

US Non-Final Office Action dated Apr. 4, 2012, U.S. Appl. No. 12/571,418, filed Sep. 30,2009, 8 pages.

Engle, Rob, "Beowulf 3D: a case study", Pros. SPIE 6803, Stereoscopic Displays and Application XIX, 68030R (Feb. 29, 2008).

* cited by examiner

APPARATUS AND METHOD FOR INDICATING DEPTH OF ONE OR MORE PIXELS OF A STEREOSCOPIC 3-D IMAGE COMPRISED FROM A PLURALITY OF 2-D LAYERS

FIELD OF THE INVENTION

Aspects of the present invention relate to conversion of two dimensional (2-D) multimedia content to stereoscopic three dimensional (3-D) multimedia content. More particularly, aspects of the present invention involve an apparatus and method for indicating stereoscopic depth of one or more pixels of a stereoscopic 3-D image.

BACKGROUND

Three dimensional (3-D) imaging, or stereoscopy, is a technique used to create the illusion of depth in an image. In many cases, the stereoscopic effect of an image is created by providing a slightly different perspective of a particular image to each eye of a viewer. The slightly different left eye image and right eye image may present two perspectives of the same object, where the perspectives differ from each other in a manner similar to the perspectives that the viewer's eyes may naturally experience when directly viewing a three dimensional scene. For example, in a frame of a stereoscopic 3-D film or video, a corresponding left eye frame intended for the viewer's left eye may be filmed from a slightly different angle (representing a first perspective of the object) from the corresponding right eye frame intended for the viewer's right eye (representing a second perspective of the object). When the two frames are viewed simultaneously or nearly simultaneously, the difference between the left eye frame and the right eye frame provides a perceived depth to the objects in the frames, thereby presenting the combined frames in what appears as three dimensions.

In creating stereoscopic 3-D animation from 2-D animation, one approach to construct the left eye and right eye images necessary for a stereoscopic 3-D effect is to first create a virtual 3-D environment consisting of a computer-based virtual model of the 2-D image, which may or may not include unique virtual models of specific objects in the image. These objects are positioned and animated in the virtual 3-D environment to match the position of the object(s) in the 2-D image when viewed through a virtual camera. For stereoscopic rendering, two virtual cameras are positioned with an offset between them (inter-axial) to simulate the left eye and right eye views of the viewer. Once positioned, the color information from each object in the original image is "cut out" (if necessary) and projected from a virtual projecting camera onto the virtual model of that object. This process is commonly referred to as projection mapping. The color information, when projected in this manner, presents itself along the front (camera facing) side of the object and also wraps around some portion of the front sides of the object. Specifically, any pixel position where the virtual model is visible to the projection camera will display a color that matches the color of the projected 2-D image at that pixel location. Depending on the algorithm used, there may be some stretching or streaking of the pixel color as a virtual model bends toward or away from the camera at extreme angles from perpendicular, but this is generally not perceived by a virtual camera positioned with sufficiently small offset to either side of the projecting camera.

Using this projection-mapped model in the virtual 3-D environment, the left eye and right eye virtual cameras will capture different perspectives of particular objects (representing the left eye and the right eye views) that can be rendered to generate left eye and right eye images for stereoscopic viewing. However, this technique to convert a 2-D image to a stereoscopic 3-D image has several drawbacks. First, creating a virtual 3-D environment with virtual models and cameras is a labor-intensive task requiring computer graphics software and artistic and/or technical talent specialized in the field of 3-D computer graphics. Second, with animated objects, the virtual model must alter over time (frame by frame) to match the movement and deformation of the object in the 2-D image. For the best results, the alteration of the model precisely matches the movement of the object(s) frame by frame. Camera movement may also be taken into account. This is a time consuming task requiring advanced tracking and significant manual labor. In addition, this requires that the 2-D image be recreated almost entirely in a virtual 3-D environment, which also requires significant manual labor, as it implies effectively recreating the entire movie with 3-D objects, backgrounds and cameras.

SUMMARY

One implementation of the present disclosure may take the form of a method of analyzing a stereoscopic image corresponding to a two dimensional planar image. The method may comprise the operation of obtaining an image comprising a plurality of pixels and a stereo depth map with the stereo depth map including depth values for the plurality of pixels. The method may also include the operations of identifying a particular depth value included in the stereo depth map, identifying each pixel of the image associated with the particular depth value and applying a first uniform pixel color to all of the identified pixels in the image.

Another embodiment may take the form of a machine-readable storage medium storing a machine-executable code that, when executed by a computer, causes the computer to perform various operations. Such operations may include displaying a user interface comprising a image panel configured to display a two dimensional digital image including at least one stereo depth map indicating a plurality of depth values for one or more pixels of the two dimensional digital image. The operations may also include receiving a selection of a first selected depth value from an input device, identifying all pixels of the two dimensional digital image having a depth value within a range defined by the first selected depth value and generating a first matte based on the identifying of all pixels. The first matte may retain the shape of the identified pixels and applying a first uniform pixel color to all of the pixels of the first matte. Finally, the operations may include displaying the first matte in place of the identified pixels of the two dimensional digital image.

Yet another embodiment may take the form of a system for analyzing a stereoscopic frame. The system may comprise a storage medium configured to store a two dimensional frame comprising a plurality of pixels, with each two dimensional frame including at least one associated stereo depth map maintaining a depth value for one or more of the plurality of pixels. The system may also include one or more computing systems associated with the storage medium and in communication with a display device and a visualization module stored on a computer readable medium in communication with the one or more computing devices. Further, the visualization module may be configured to receive a selection of a stereoscopic depth value input, analyze the stereo depth map

DETAILED DESCRIPTION

Figure 1:
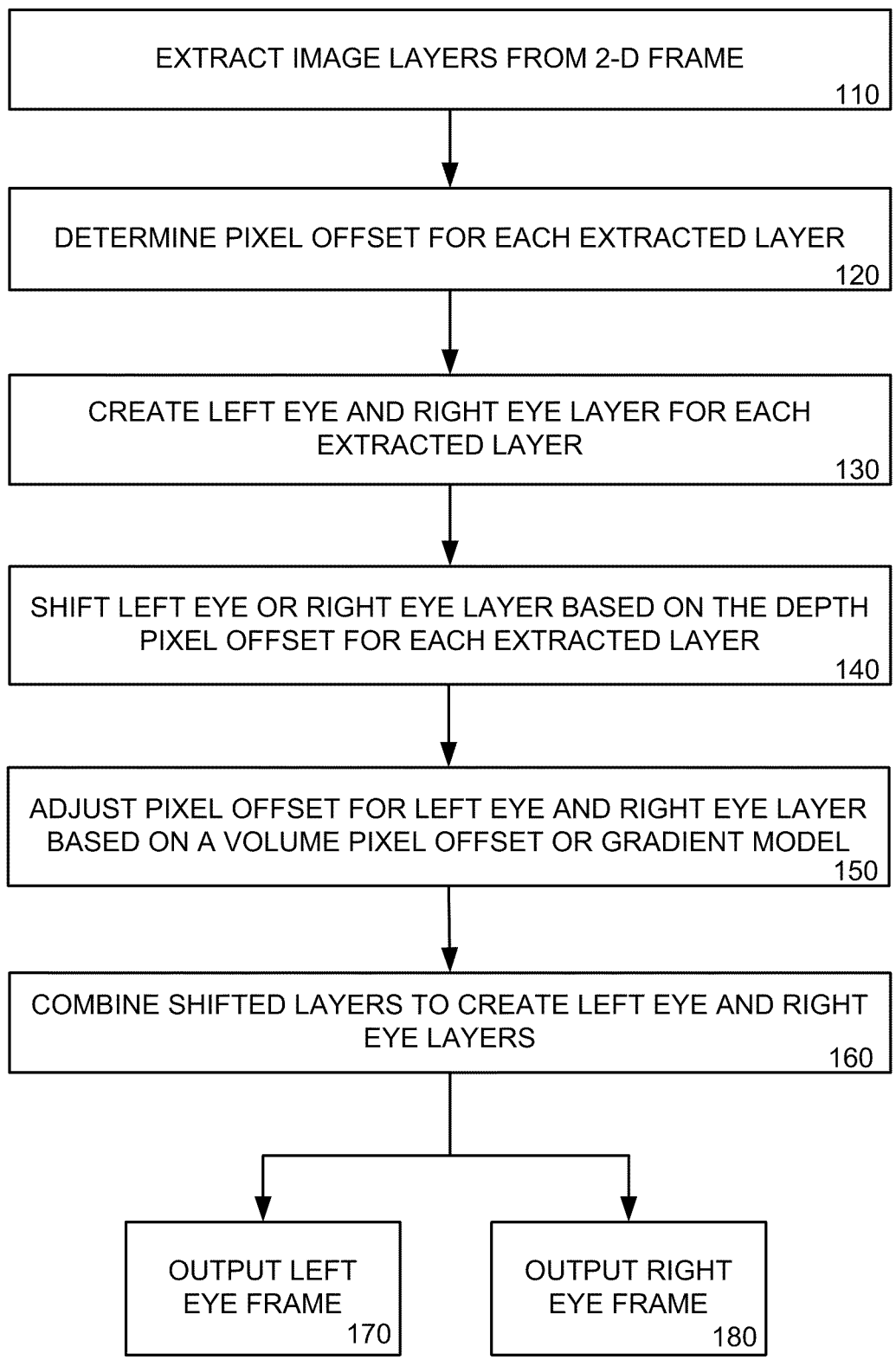
FIG. 1 is a flowchart of a method for converting a 2-D image to a stereoscopic 3-D image by extracting one or more object layers of the 2-D image and applying a pixel offset to each layer.

Implementations of the present disclosure involve methods and systems for converting a 2-D multimedia image to a stereoscopic 3-D multimedia image by obtaining layer data for a 2-D image where each layer pertains to some image feature of the 2-D image, duplicating a given image feature or features and offsetting in the x-dimension one or both of the image features to create a stereo pair of the image feature. The layers may be reproduced as a corresponding left eye version of the layer and a corresponding right eye version of the layer. Further, the left eye layer and/or the right eye layer data is shifted by a pixel offset to achieve the desired 3-D effect for each layer of the image. Offsetting more or less of the x value of each pixel in an image feature of a layer creates more or less stereoscopic depth perception. Thus, when two copies of an image feature are displayed with the image feature pixel offset, with appropriate viewing mechanisms, the viewer perceives more or less stereo depth depending on the amount of pixel offset. This process may be applied to each frame of a animated feature film to convert the film from 2-D to 3-D.

In this manner, each pixel of the 2-D image has an associated pixel offset or z-axis position that represents perceived depth of the pixel within the corresponding 3-D stereoscopic image. However, determining the depth of the individual pixels of the stereoscopic 3-D image may be difficult by merely viewing the left eye and right eye versions of the 2-D image. Rather, when the left eye and right eye versions are combined, the resulting image may contain either conflicting depth cues or subtle inaccuracies that are difficult to perceive and correct, even when viewed through appropriate viewing devices such as anaglyph red/blue, polarized lens or simultaneous display methods with appropriate glasses. For example, if an object is closer to the observer in the stereo image but is occluded by an object that is farther from the observer in the stereo image, the stronger depth cue—occlusion, in this case—will dominate in normal stereo viewing systems and typically will appear to the observer such that the farther object looks closer and the closer object looks farther in stereo depth. This may either go unperceived or may cause visual discomfort for the viewer, but in either case the cause of the conflict may be difficult to determine using a simple stereo viewing system. The quality of the viewing device or depth acuity of the computer user are further examples of factors that result in poor or incorrect depth composition of a stereoscopic 3-D image. Thus, what is needed is a method to view a 2-D image of a corresponding stereoscopic 3-D image that provides the accurate depth of the individual pixels of the stereoscopic image to a user.

Thus, implementations of the present disclosure include an interface that provides a user with an output image representative of one or more layers of the 2-D image. The pixels of the output image maintain the pixel offset values of each of the pixels such that the user may determine the relative depth of the pixels of the image and thereby determine the relative depth of various objects or portions of objects in the image. For example, the output image may color each pixel with a corresponding gray scale or color value that represents the perceived depth of the pixel in the 3-D image. Thus, each pixel of the layer of the 2-D image or a composite of all of the layers of the image are viewed by the user to determine the perceived stereoscopic effects in the corresponding 3-D image. In addition, one or more x-offset or pixel offset values or z-axis positions may be individually selected such that any pixel of the output image that correspond to the selected values is indicated in the output image. By providing the user with a visualization tool to quickly determine the perceived position of any pixel of a stereoscopic image, the user may confirm the proper alignment of the objects of the image in relation to the image as a whole. Further, such information may be used by an artist or animator to provide more or less pixel offset to a layer or object of the stereoscopic 3-D image to adjust the perceived depth of the image.

For convenience, the embodiments described herein refer to a 2-D image as a "frame" or "2-D frame." However, it should be appreciated that the methods and devices described herein may be used to convert any 2-D multimedia image into a stereoscopic 3-D image, such as 2-D multimedia images including a photo, a drawing, a computer file, a frame of a live action film, a frame of an animated film, a frame of a video or any other 2-D multimedia image. Further, the term "layer" as used herein indicates any portion of a 2-D frame, including any object, set of objects, or one or more portions of an object from a 2-D frame. Thus, the depth model effects described herein may be applied to any portion of a 2-D frame, irrespective of whether the effects are described with respect to layers, objects or pixels of the frame.

FIG. 1 is a flowchart of a method for converting a 2-D multimedia frame to a stereoscopic 3-D multimedia frame by utilizing layers of the 2-D frame. Several operations of the method are described in detail in related United States Patent Application titled "METHOD AND SYSTEM FOR UTILIZING PRE-EXISTING IMAGE LAYERS OF A TWO DIMENSIONAL IMAGE TO CREATE A STEREOSCOPIC IMAGE" by Tara Handy Turner et. al., U.S. application Ser. No. 12/571,407 filed Sep. 30, 2009, the contents of which are incorporated in their entirety by reference herein. By performing the following operations for each frame of a 2-D animated film and combining the converted frames in sequence, the animated 2-D film may similarly be converted into a stereoscopic 3-D film. In one embodiment, the operations may be performed by one or more workstations or other computing systems to convert the 2-D frames into stereoscopic 3-D frames.

Figure 2:
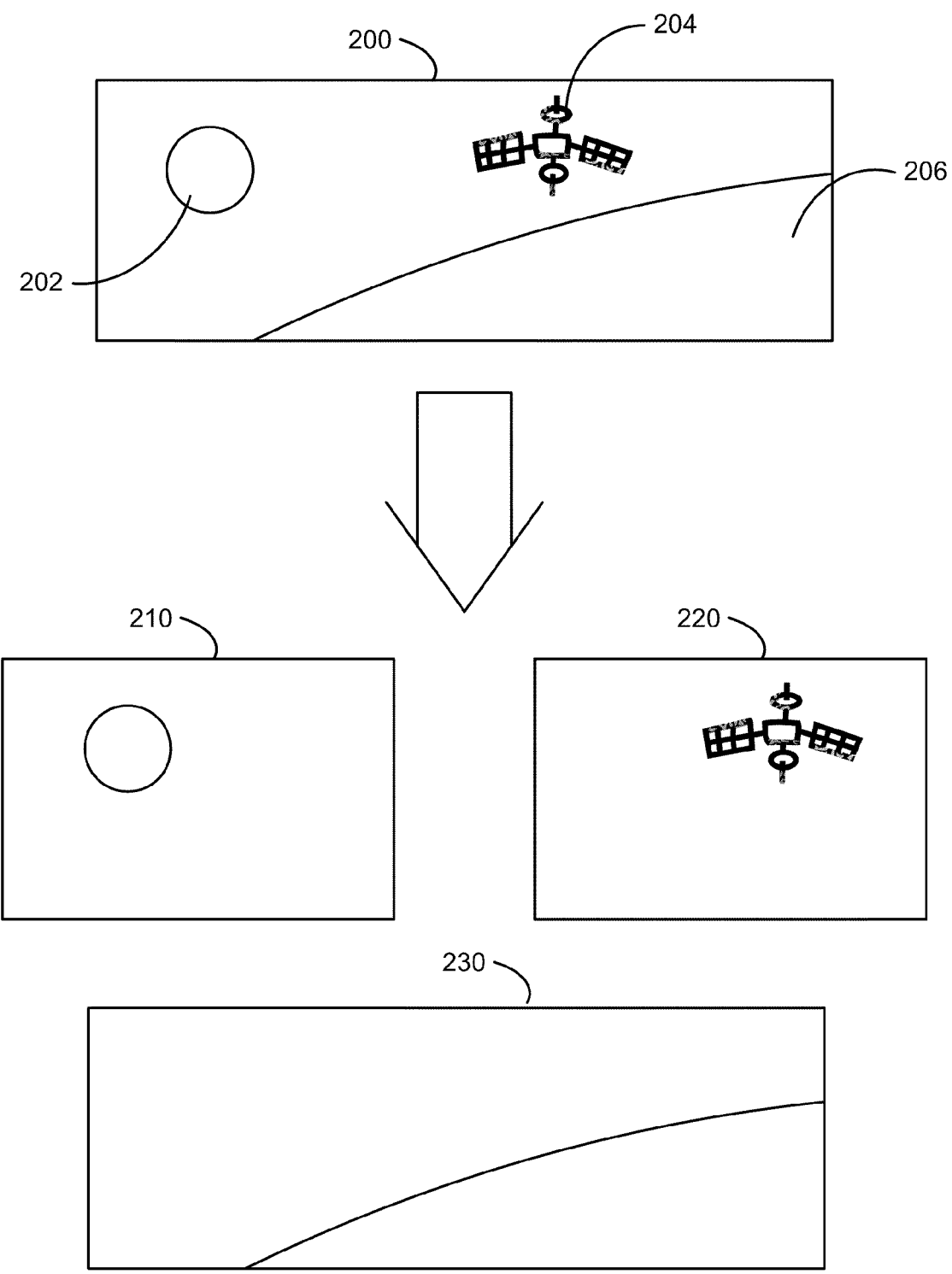
FIG. 2 is a diagram illustrating a plurality of layers of an image of an animated multimedia presentation.

The method may begin in operation 110 where one or more layers are extracted from the 2-D frame by a computer system. A layer may comprise one or more portions of the 2-D frame. The example 2-D frame 200 of FIG. 2 illustrates a space scene including three objects; namely, a moon 202, a satellite 204 and a planet 206. Each of these objects are extracted from the 2-D image or otherwise provided as separate layers of the frame 200. The layers of the 2-D image 200 may include any portion of the 2-D image, such as an object, a portion of the object or a single pixel of the image. As used herein, a layer refers to a collection of data, such as pixel data, for a discrete portion of image data where the meaningful color data exists for the entirety of the image or, in some cases, for some area less than the entirety of image data. For example, if an image consists of a moon 202, satellite 204 and a planet 206, image data for the moon may be provided on a layer and image data for the satellite and planet may be provided on separate and distinct layers.

The layers can be extracted from the composite 2-D frame in several ways. For example, the content of each extracted layer can be digitally extracted from the 2-D frame by a computing system utilizing a rotoscoping tool or other computer image processing tool to digitally remove a given object(s) and insert a given object(s) into a distinct layer. In another example, the layers for a 2-D frame may be digitally stored separately in a computer-readable database. For example, distinct layers pertaining to each frame of a cell animated feature film may be digitally stored in a database, such as the Computer Animation Production System (CAPS) developed by the Walt Disney Company in the late 1980s.

The methods and systems provided herein describe several techniques and a user interface for segmenting a region of a 2-D frame or layer, as well as creating a corresponding matte of the region for the purpose of applying a pixel offset to the region. Generally, these techniques are utilized to segment regions of a layer such that certain 3-D effects may be applied to the region, separate from the rest of the layer. However, in some embodiments, the techniques may also be used to segment regions of a 2-D frame to create the one or more layers of the frame. In this embodiment, a region of the 2-D frame is segmented as described herein and stored as a separate file or layer of the 2-D frame in a computing system.

Figure 3:
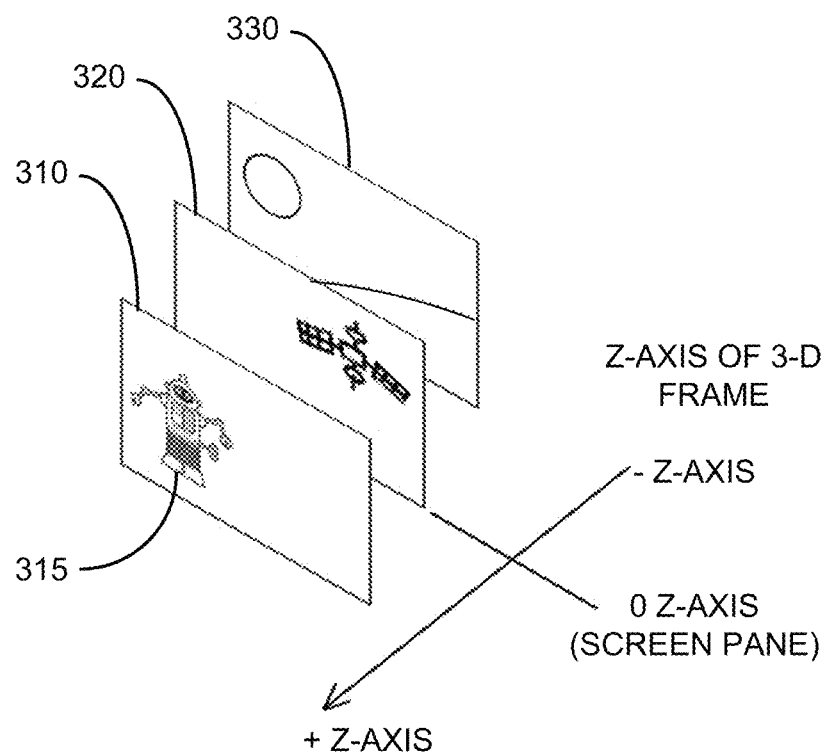
FIG. 3 is a diagram illustrating the position of several layers of a stereoscopic 3-D frame along a perceptual z-axis of the stereoscopic 3-D frame.

Upon extraction of a layer or otherwise obtaining layer pixel data, a user or the computing system may determine a pixel offset for the layer pixel data in operation 120. Each pixel, or more likely a collection of adjacent pixels, of the 2-D frame may have an associated pixel offset that determines the object's perceived depth in the corresponding stereoscopic 3-D frame. For example, FIG. 3 is a diagram illustrating the perceived position of several layers of a stereoscopic 3-D frame along a z-axis of the stereoscopic 3-D frame. As used herein, the z-axis of a stereoscopic 3-D frame or image represents the perceived position of a layer of the frame when viewed as a stereoscopic 3-D image. In one particular embodiment, any layer 310 of the stereoscopic 3-D frame appearing in the foreground of the frame has a corresponding positive z-axis position that indicates the position of the layer relative to the plane of the screen from which the stereoscopic 3-D frame is presented. Additionally, any layer 330 appearing in the background of the stereoscopic 3-D frame has a corresponding negative z-axis position while a layer 320 appearing on the plane of the screen may have a zero z-axis position. However, it should be appreciated that the layers of the frame are not physically located at a z-axis positions described herein. Rather, because the stereoscopic 3-D frame appears to have depth when viewed in stereoscopic 3-D, the z-axis position merely illustrates the perceived position of a layer relative to the screen plane of the stereoscopic 3-D frame. Though not a requirement, this position, and hence the screen plane in this example, very often corresponds to what is known as the point of convergence in a stereoscopic system. Further, it is not necessary that a positive z-axis position correspond to the layer appearing in the foreground of the stereoscopic 3-D frame and a negative z-axis position correspond to the layer appearing in the background. Rather, any value may correspond to the perceived position of the layer of the stereoscopic 3-D frame as desired. For example, in some computer systems, layers that are perceived in the background of the stereoscopic 3-D frame may have a positive z-axis position while those layers in the foreground have a negative z-axis position. In still another example, the zero z-axis position corresponds with the furthest perceived point in the background of the stereoscopic 3-D frame. Thus, in this example, every layer of the stereoscopic 3-D frame has a positive z-axis position relative to the furthest perceived point in the background. As used herein, however, a z-axis position value corresponds to the example shown in FIG. 3.

In the example of FIG. 3, each pixel of any particular layer of the 2-D frame has the same pixel offset. Thus, each object of the layer appears at the same z-axis position within the stereoscopic 3-D frame. Moreover, while each object, e.g. the moon 202, the satellite 204 and the planet 206, are given a z-axis depth, each object appears flat or with no volume. Stated differently, initially a pixel offset is applied uniformly to all pixels of a given object or layer. To provide a non-flat appearance of a given object and a more realistic stereoscopic 3-D effect, the pixel offset of one or more pixels of the layer is adjusted to add volume or a more detailed depth perception to the objects of the layer, or to otherwise provide non-uniformity to the object through variable pixel offsets.

For example, returning to FIG. 2, the moon 202 object has a round shape. While the stereoscopic depth of the moon layer 210 layer provides a stereoscopic depth as to the orientation of the moon in relation to the other shapes of the frame, the moon object itself still appears flat. Thus, to provide a volume stereoscopic 3-D effect to the moon 202 object, pixel offset for the pixels defining the moon object are adjusted such that the pixels of the moon are located either in the foreground or background of the stereoscopic 3-D frame in relation to the moon layer 210, or are not adjusted and are maintained at the moon layer, thereby providing the moon object with stereoscopic volume. Several techniques to apply volume to the layers of an frame are described in greater detail in related United States Patent application titled "METHOD AND SYSTEM FOR CREATING DEPTH AND VOLUME IN A 2-D PLANAR IMAGE" by Tara Handy Turner et. al., U.S. application Ser. No. 12/571,406 filed Sep. 30, 2009, the entirety of which is incorporated by reference herein. This volume process may be applied to any layer of the 2-D frame, including being applied to one or more objects of a particular layer. Thus, the volume applied to one object of a particular layer may differ from the volume applied to a separate object of the same layer. Generally, the stereoscopic volume may be applied individually to any aspect of the 2-D frame. Moreover, stereoscopic volume may be applied to any given object irrespective of its relation to a layer or any other object.

Additional stereoscopic techniques for pixel offset may be utilized to provide this volumetric and depth detail to the stereoscopic 3-D effect applied to the 2-D frame. One such adjustment involves utilizing gradient models corresponding to one or more frame layers or objects to provide a template upon which a pixel offset adjustment may be made to one or more pixels of the 2-D frame. For example, returning to FIG. 2, it may be desired to curve the planet 206 object of the planet layer 230 such that the planet appears to curve away from the viewer of the stereoscopic 3-D frame. To achieve the desired appearance of the planet 206, a gradient model similar in shape to the planet 206 object may be selected and adjusted such that the gradient model corresponds to the planet object and provides a template from which the desired stereoscopic 3-D effect may be achieved for the object. Further, in those layers that include several objects of the 2-D frame, gradient models may be created for one or more objects such that a single stereoscopic 3-D effect is not applied to every object of the layer. In one embodiment, the gradient model may take the form of a gray scale template corresponding to the object, such that when the frame is rendered in stereoscopic 3-D, the whiter portions of the gray scale gradient model corresponds to pixels of the object that appear further along the z-axis position (either in the foreground or background) of the layer than the pixels of the object that correspond to the darker portions of the gradient model, such that the object appears to extend towards or away from the viewer of the stereoscopic 3-D frame. Several techniques related to creating depth models to render a 2-D frame in 3-D are described in greater detail in related United States Patent application titled "GRADIENT MODELING TOOLKIT FOR SCULPTING STEREOSCOPIC DEPTH MODELS FOR CONVERTING 2-D IMAGES INTO STEREOSCOPIC 3-D IMAGES" by Tara Handy Turner et. al., U.S. application Ser. No. 12/571,412 filed Sep. 30, 2009, the entirety of which is incorporated by reference herein.

Once the desired depth pixel offset and the adjusted pixel offset based on a volume effect or gradient model are determined for each layer and pixel of the 2-D frame in operation 120, corresponding left eye and right eye frames are generated for each layer in operation 130 and shifted in response to the combined pixel offset in operation 140 to provide the different perspectives of the layer for the stereoscopic visual effect. For example, to create a left eye or right eye layer that corresponds to a layer of the 2-D frame, a digital copy of the 2-D layer is generated and shifted, either to the left or to the right in relation to the original layer, a particular number of pixels based on the pixel offset for relative perceptual z-axis positioning and/or individual object stereoscopic volume pixel offsetting. Hence, the system generates a frame copy of the layer information with the x-axis or horizontal pixel values shifted uniformly some value to position the object along a perceptual z-axis relative to other objects and/or the screen, and the system further alters the x-axis or horizontal pixel position for individual pixels or groups of pixels of the object to give the object stereoscopic volume. When the corresponding left eye and right eye frames are viewed simultaneously or nearly simultaneously, the object appearing in the corresponding frames appears to have volume and to be in the foreground or background of the stereoscopic 3-D frame, based on the determined pixel offset.

In general, the shifting or offsetting of the left or right eye layer involves the horizontal displacement of one or more pixel values of the layer. For example, a particular pixel of the left or right eye layer may have a pixel color or pixel value that defines the pixel as red in color. To shift the left or right eye layer based on the determined pixel offset, the pixel value that defines the color red is horizontally offset by a certain number of pixels or other consistent dimensional measurement along the x-axis or otherwise horizontal, such that the new or separate pixel of the layer now has the shifted pixel value, resulting in the original pixel horizontally offset from the copy. For example, for a pixel offset of 20, a pixel of the left or right eye layer located 20 pixels either to the left or the right is given the pixel value defining the color red. Thus, there is a copy of the pixel horizontally offset (x-offset) from the original pixel, both with the same color red, 20 pixels apart. In this manner, one or more pixel values of the left or right eye layer are horizontally offset by a certain number of pixels to created the shifted layer. As used herein, discussion of "shifting" a pixel or a layer refers to the horizontal offsetting between the original pixel value and its copy.

Figure 4:
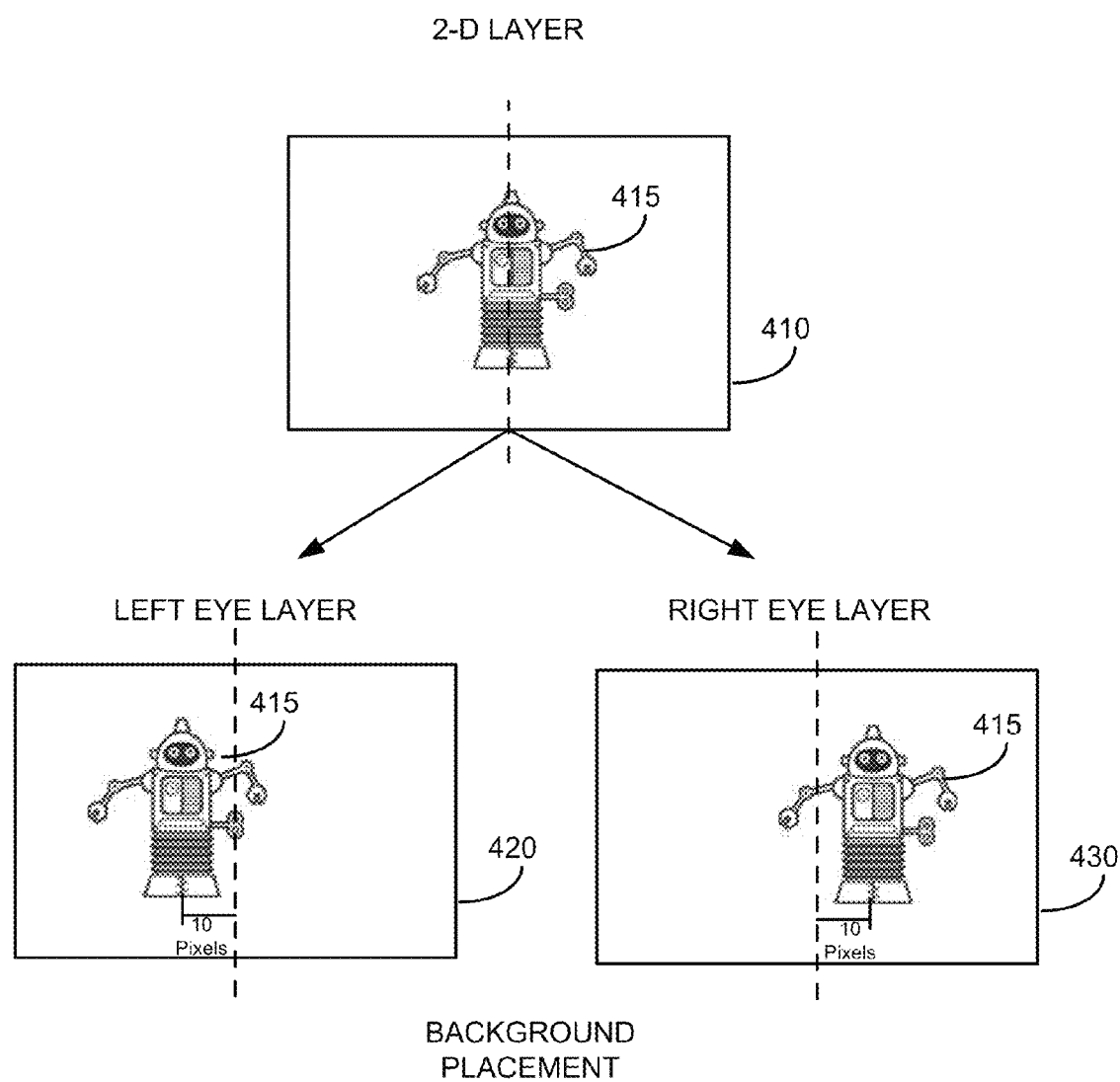
FIG. 4 is a diagram illustrating the creation of corresponding left eye and right eye image layers from a 2-D image layer, with both image layers shifted such that the total pixel shift of the image layers equals a determined pixel offset.

FIG. 4 is a diagram illustrating the creation of corresponding left eye and right eye layers from a 2-D layer, with both left eye and right eye layers shifted such that the total pixel shift of the layers equals the depth pixel offset. As shown in FIG. 4, a left eye layer 420 and a right eye layer 430 are created from the 2-D layer 410 such that the combination of the left eye layer and the right eye layer provides a stereoscopic 3-D effect to the contents of the layer. In this embodiment, the left eye layer 420 is shifted to the left while the right eye layer 430 is shifted to the right along the x-axis in response to a pixel offset. Generally, the shifting of the left eye and/or right eye layers occur in the x-axis only. When the shifted right eye layer 430 and the shifted left eye layer 420 are viewed together, the robot character 415 appears in the background, or behind the screen plane. To place a layer in the foreground of the stereoscopic 3-D frame, the corresponding left eye layer 410 is shifted to the right while the right eye layer 420 is shifted to the left along the x-axis. When the shifted right eye layer 420 and the shifted left eye layer 410 are viewed together, the robot character 415 appears in the foreground of the frame, or in front of the screen plane. In general, the depth pixel offset is achieved through the shifting of one of the left eye or right eye layers or the combined shifting of the left eye and the right eye layers in either direction.

The number of pixels that one or both of the left eye and right eye layers are shifted in operation 140 may be based on the depth pixel offset value. In one example, the pixel offset may be determined to be a 20 total pixels, such that the layer may appear in the background of the stereoscopic 3-D frame. Thus, as shown in FIG. 4, the left eye layer 420 may be shifted ten pixels to the left from the original placement of the 2-D layer 410, while the right eye layer 430 may be shifted ten pixels to the right. As can be seen, the robot character 415 of the left eye layer 420 has been displaced ten pixels to the left of the center depicted by the vertical dashed line while right eye layer 430 has been displaced to the right of center by ten pixels. Thus, the total displacement of the layers between the left eye layer 420 and the right eye layer 430 is 20 pixels, based on the determined pixel offset. It should be appreciated that the particular number of pixels that each layer is shifted may vary, as long as the number of pixels shifted for both layers equals the overall pixel offset. For example, for a 20 pixel offset, the left layer may be shifted five pixels while the right layer may be shifted 15 pixels. Shifting the left and right eye layers in this way will result in a slightly different perspective of the layer than shifting in equal amounts, but this result may generate a desired creative effect or may be negligible to the viewer while being advantageous for the purposes of simplifying an image processing step such as the extraction of the layer.

Returning to FIG. 1, in operation 150, the computer system adjusts the pixel offset of a layer or object based on a stereoscopic volume or applied gradient model. The system orients a given object or layer along a perceptual z-axis by generating a copy of the object or layer and positioning the object and its copy relative to each other along an x-axis or horizontally. The degree of relative positioning determines the degree of perceptual movement fore and aft along the perceptual z-axis. However, a given object initially appears flat as the object and its copy are uniformly displaced. To provide an object with stereoscopic volume and depth, portions of an object and the corresponding portion of the object copy are relatively positioned differently (more or less) than other portions of the object. For example, more or less x-axis pixel offset may be applied to some portion of an object copy relative to other portions of an object copy, to cause the perceived position of some portion of the object to be at a different position along the perceptual z-axis relative to other portions of the object when the left and right eye layers are displayed.

In one embodiment, a separate gray scale template is created and applied to an object of the 2-D frame such that, after application of the pixel offset to the left eye layer and the right eye layer at a percentage indicated by the gray scale value of the template image at that pixel location, the whiter portions of the gray scale correspond to pixels in the image that appear further in the foreground than the darker portions. Stated differently, the gray scale provides a map or template from which the adjusted pixel offset for each pixel of an object may be determined. In this manner, a stereoscopic volume is applied to an object. The same gray scale may be generated by utilizing one or more gradient modeling techniques.

Therefore, based on the determined depth pixel offset (which perceptually positions a layer along the perceptual z-axis of the stereoscopic 3-D frame) and the gradient model pixel offset (which adjusts the depth pixel offset for one or more pixels of an object to provide the object with the appearance of having volume and a more detailed depth), the left eye layer and right eye layer, and specific portions of the left and/or right eye layer, are shifted to provide the stereoscopic 3-D frame with the desired stereoscopic 3-D effect. Thus, in some embodiments, each pixel of a particular stereoscopic 3-D frame may have an associated pixel offset that may differ from the pixel offsets of other pixels of the frame. In general, any pixel of the 2-D frame may have an associated pixel offset to place that pixel in the appropriate position in the rendered stereoscopic 3-D frame.

Operations 110 through 150 may repeated for each layer of the 2-D frame such that corresponding left eye layers and right eye layers are created for each layer of the frame. Thus, upon the creation of the left eye and right eye layers, each layer of the frame has two corresponding layers (a left eye layer and a right eye layer) that is shifted in response to the depth pixel offset for that layer and to the volume pixel offset for the objects of the layer.

In operation 160, the computer system combines each created left eye layer corresponding to a layer of the 2-D frame with other left eye layers corresponding to the other layers of the 2-D frame to construct the complete left eye frame to be presented to the viewer. Similarly, the computer system combines each right eye layer with other right eye layers of the stereoscopic 3-D frame to construct the corresponding right eye frame. The combined left eye frame is output for the corresponding stereoscopic 3-D frame in operation 170 while the right eye frame is output for the corresponding stereoscopic 3-D frame in operation 180. When viewed simultaneously or nearly simultaneously, the two frames provide a stereoscopic effect to the frame, converting the original 2-D frame to a corresponding stereoscopic 3-D frame. For example, some stereoscopic systems provide the two frames to the viewer at the same time but only allows the right eye to view the right eye frame and the left eye to view the left eye frame. One example of this type of stereoscopic systems is a red/cyan stereoscopic viewing system. In other systems, the frames are provided one after another while the system limits the frames to the proper eye. Further, to convert a 2-D film to a stereoscopic 3-D film, the above operations may be repeated for each frame of the film such that each left eye and right eye frame may be projected together and in sequence to provide a stereoscopic 3-D effect to the film.

By performing the operations of the method illustrated in FIG. 1, a layer or portions of the layer of a 2-D frame may have a depth pixel offset associated with the position of the layer in the stereoscopic 3-D frame and/or a volume pixel offset to provide an object or region of the layer with a perceptual position (e.g. at, fore or aft of a screen) and/or stereoscopic volume effect. More particularly, each pixel of the 2-D frame may have a corresponding pixel offset or z-axis value, herein referred to as a depth value, associated with the perceived position of the pixel in the stereoscopic 3-D frame. The depth value of each pixel of the 2-D frame may be utilized by an animator or artist to determine the appearance of objects and layers of the corresponding stereoscopic 3-D frame. Aspects of the present disclosure provide a user interface and method that displays an output image corresponding to a stereoscopic 3-D frame that provides an indication of the perceived depth of one or more pixels of the stereoscopic 3-D frame. In one embodiment, one or more particular pixel offset or depth values are selected through the user interface such that each pixel of the stereoscopic image that corresponds to the selected depth value is indicated in the output image. Such indication may be provided by coloring the selected pixels with a defined color to differentiate those pixels from the rest of the output image. In another embodiment, each pixel of the output image is colored or shaded with one or more color or grayscale values to indicate the particular pixel offset or depth value for the pixels of the stereoscopic frame.

Figure 5:
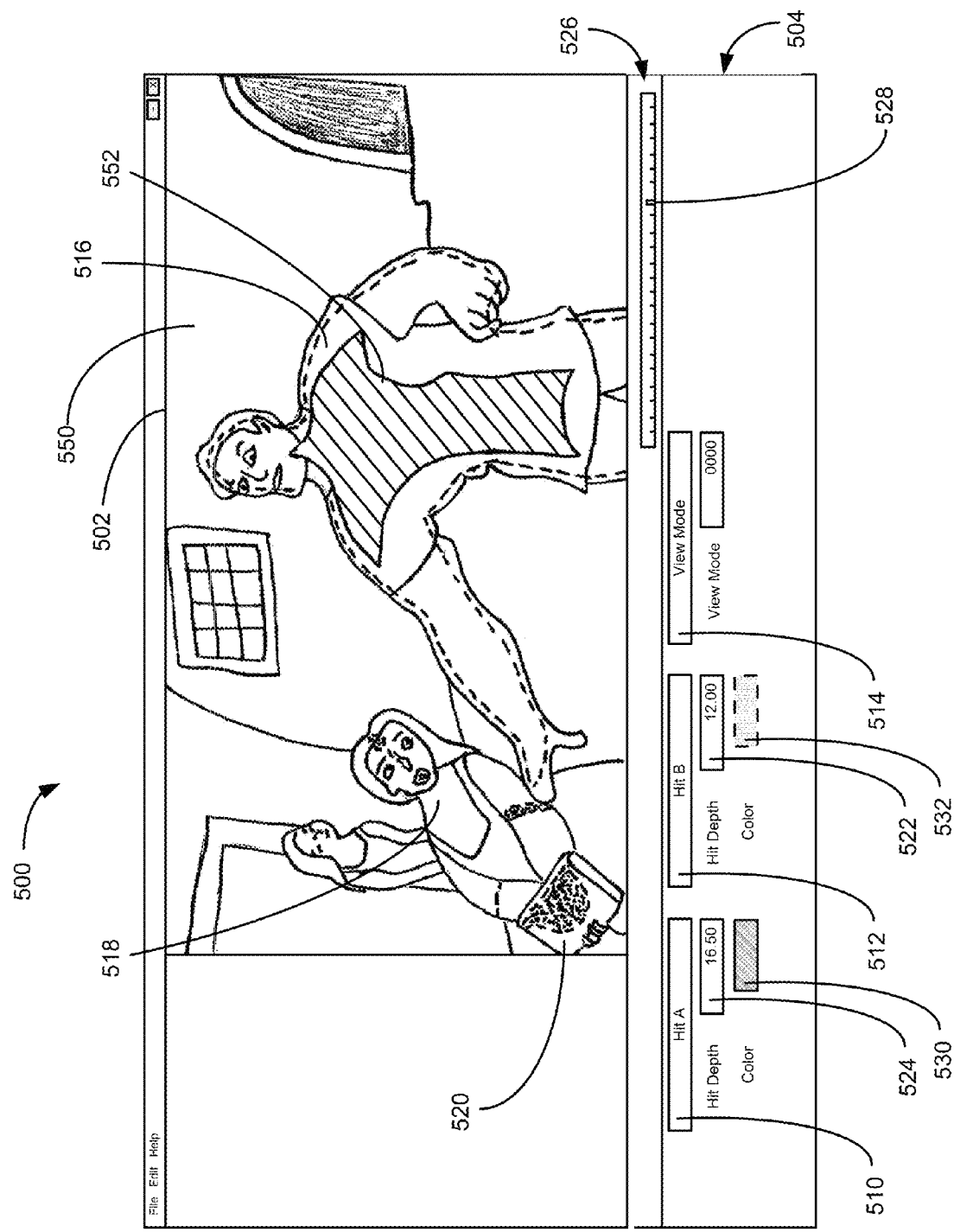
FIG. 5 is a diagram illustrating a user interface displaying an output image corresponding to a frame of a multimedia presentation, including several pixels of the output image that correspond to one or more selected pixel offset values colored black and white.

FIG. 5 is a diagram illustrating a user interface displaying an output image corresponding to a frame of a multimedia presentation, including several pixels of the output image that correspond to one or more selected pixel offset values colored black and white. Through the user interface 500, an animator or artist may highlight or otherwise identify those pixels of a stereoscopic 3-D frame that appear at the same location along a perceptual z-axis of the frame. Further, a plurality of depth values may be utilized such that the user can compare the depth placement of some pixels along the perceptual z-axis in relation to other pixels of the frame to determine the stereoscopic appearance of one or more objects of the frame. The features of the user interface discussed herein may be further incorporated into other user interfaces. One such user interface is discussed in detail in related U.S. patent application Ser. No. 12/650,800 titled "LAYER MANAGEMENT SYSTEM FOR CHOREOGRAPHING STEREOSCOPIC DEPTH" by Tara Handy Turner et. al., the contents of which are incorporated in their entirety by reference herein.

The user interface 500 shown includes several interactive panels, including an image panel 502 and a control panel 504. The image panel 502 presents an output image 550 to a user that corresponds to a 2-D frame of a multimedia presentation.

The output image 550 may contain all or some of the corresponding 2-D frame, such as an object of the 2-D frame or a portion of an object. In the example shown, the output image 550 contains the entire frame of an animated 2-D film, including all relevant layers of the frame. However, the output image 550 displayed in the image panel 502 may contain all or a portion of any 2-D image, including contents of a live action film. Further, while the output image 550 displayed in the image panel 502 is in black and white in FIG. 5, the output image may include color such that the output image closely resembles the corresponding 2-D frame.

The output image 550 may also correspond to a stereoscopic 3-D frame. As described herein, one or more 2-D images may be converted to corresponding stereoscopic 3-D images through the techniques described. Thus, the output image 550 may correspond to a 2-D frame and the associated stereoscopic 3-D frame, such that each pixel of the output image may correspond to one or more pixels of a 2-D frame as well as one or more pixels of a stereoscopic 3-D frame. To map to the stereoscopic frame, each pixel of the output image 550 includes a depth value that indicates the depth position along the perceptual z-axis of the corresponding stereoscopic 3-D frame.

The control panel 504, in this embodiment located along the bottom of the interface 500, contains one or more "hit" bars 510, 512 and a mode selector 514. In general, the hit bars 510, 512 are utilized to identify those pixels of the output image 550 that correspond to one or more pixel offset values or z-axis positions in a corresponding stereoscopic 3-D frame. For example, in the embodiment shown, two hit bars 510, 512 are activated for the output image 550 displayed in the image panel 502. While two hit bars are shown in FIG. 5, it should be appreciated that the user interface 500 may include any number of hit bars. The hit bar A 510 of FIG. 5 is set to highlight any pixels with a corresponding pixel offset of 16.50 pixels in the corresponding stereoscopic frame. The hit bar B 512 is set to highlight any pixels with a corresponding pixel offset of 12.00 pixels in the corresponding stereoscopic frame. Those pixels that are defined or otherwise indicated by hit bar A 510 are identified in the output image 550 of FIG. 5 by those areas defined the hashed areas. The pixels that are defined or otherwise indicated by hit bar B 512 are identified in the output image 550 by the dashed line, including the areas between the dashed lines and filled with the dotted areas. In particular, some of the pixels that define a first character 516 are identified by hit bar B 512, as shown by the dashed line that traces an outline of the character. Similarly, some of the pixels that define a second character 518 are also identified by hit bar B 512, as shown by the dashed lines and dotted areas on the face of the second character. In addition, many of the pixels that define the object 520 held by the second character 518 are also identified by hit bar B 512, including the dotted area of the object. The pixels identified by hit bar B 512 are displayed in the output image 550 as dashed lines and dotted areas to differentiate those pixels from the rest of the frame or to otherwise indicate these pixels to a user of the user interface 500. However, the pixels may be identified in any manner that differentiates those pixels from the rest of the image. For example, a particular color may be associated with each hit bar such that the identified pixels are colored in response to the selected color for that hit bar.

A pixel identifier box or color swatch may be included for each hit bar that sets the color or identifier for each identified or selected pixel. For example, hit bar A 510 includes an identifier box 530 that selects the hashed area for the identified pixels at the depth set by hit bar A. Similarly, hit bar B 512 includes an identifier box 532 that selects a dashed line and dotted area for the identified pixels at the depth set by hit bar B. However, the identified pixels corresponding to hit bar B 512 may also be identified by color. For example, in the embodiment where the output image 550 includes color, the identified pixels may be colored red or another bright color to differentiate those pixels as being identified or defined by hit bar B 512. The color for each hit bar may be selected in any number of ways, including a drop down menu or a color palette that is presented to the user when the hit bar is activated. Once selected, the corresponding color swatch 530, 532 maintains the selected color such that the user can identify the color associated with each hit bar.

In practical terms, because the pixels of the output image 550 that are identified in response to hit bar B 512 have the same or similar pixel offset or depth value, these pixels are perceived at the same position along a perceptual z-axis of the corresponding 3-D stereoscopic frame to the output image. Stated differently, the identified pixels of the object 520 (the portion of the object that is defined by the dashed lines and dotted area) have the same or similar pixel offsets and would appear at the same depth position within the foreground of the stereoscopic frame as the identified pixels of the first character 516 and the second character 518. In this manner, the hit bars 510, 512 are utilized to identify those pixels that share the same perceived depth position along the perceptual z-axis of the stereoscopic frame. Such information may be useful to an artist or animator when constructing a stereoscopic 3-D frame, as the depth position of each object along the perceptual z-axis of the stereoscopic frame may be inferred from the identified pixels in the output image 550. For example, an animator may determine that the object 520 is properly located in the foreground of the corresponding stereoscopic 3-D frame. Further, through the use of multiple hit bars, an animator may further determine the location of the object 520 in relation to the rest of the stereoscopic frame. Thus, the animator may determine the perceived placement of each object or layer of the stereoscopic frame by utilizing one or more hit bars 510, 512. Further, if the animator then determines that the depth placement of the objects or portions of the stereoscopic 3-D frame is not correct, more or less pixel offsetting may be applied to the left eye and right eye versions of the stereoscopic frame to adjust the perceived depth of one or more portions of the frame.

To determine which pixels are identified by the hit bars 510, 512, a user inputs or otherwise identifies a depth value in a text box 522, 524 that is associated with the hit bar. The depth value input in the text box corresponds to the depth of the pixels in the output image 550 that are identified by the hit bar. For example, in the figure shown, the hit depth value of hit bar B 512 is shown as 12.00 in the corresponding text box 522. Thus, hit bar B 512 indicates each pixel of the output image 550 that corresponds to a pixel offset of 12.00 pixels. This value corresponds to a pixel offset or z-axis position of one or more pixels within a stereoscopic 3-D frame that corresponds to the output image 550 shown in the image panel 502. Thus, each pixel of the output image 550 that corresponds to the depth value of hit bar B 512 is identified or colored a particular color associated with the hit bar such that a user can identify the selected pixels. In other words, the pixels of the output image 550 that are identified by the hashed area, in this example, each correspond to one or more pixels of a corresponding stereoscopic frame that have a depth value (pixel offset or z-axis position) that equals the depth value in the text box 524. In this manner, a user of the user interface 500 inputs a particular depth value into a text box of a hit bar and those pixels of the output image 550 that have the same or similar depth value associated with the pixel is highlighted in some way.

While the depth value of the embodiment shown in FIG. 5 is input by a user of the user interface, other methods to input the desired depth value for a hit bar may be utilized. For example, in another embodiment, the user may use an input device to the computer system, such as a mouse or keyboard, to select a particular pixel within the output image 550. Once selected by the user, the computer system inputs the depth value of the selected pixel into one of the hit bar text boxes 510, 512 such that every pixel of the output image 550 that has the same depth value is colored or otherwise identified by the interface 500.

Further, the hit depth value associated with the one or more hit bars may take many forms. In the embodiment shown, the depth values 522, 524 of hit bar A 510 and hit bar B 512 are based on the perceived location of the pixel along the perceptual z-axis of the stereoscopic frame, similar to that described in relation to FIG. 3. Thus, those pixels that are perceived to be located in the foreground of the frame are given a positive depth value, while those pixels in the background are provided with a negative depth value. However, the 0-axis point of the stereoscopic frame may be located anywhere along the perceptual z-axis of the stereoscopic frame. In addition, the higher the depth value, the further from the 0-axis point the pixel is perceived, either in the foreground of the background of the frame. Thus, returning to FIG. 5, the depth value of hit bar B 512 is defined as 12.00 pixels, while the depth value of hit bar A 510 is defined as 16.50 pixels. Thus, in this embodiment, the pixels that are identified by hit bar A 510 are further in the foreground of the corresponding stereoscopic frame than those pixels identified by hit bar B 512, due to the higher depth value of hit bar A. In this example, a hit bar with a depth value of zero would highlight those pixels that are perceived to the located at the screen plane, while a hit bar with a negative depth value would highlight pixels in the background of the stereoscopic frame. Generally, the depth value, no matter how it is expressed by the user interface, corresponds to the perceived position of a pixel along a perceptual z-axis of a stereoscopic frame such that the user, by providing a depth value for a hit bar, may determine the perceived position of any pixel of the stereoscopic frame.

In one embodiment (such as that shown in FIG. 5), the depth value may correspond to the pixel offset (x-offset) value of the pixels of the stereoscopic frame. In another embodiment, the depth value may correspond to the z-axis position of the pixels of the stereoscopic frame. For example, hit bar A 510 may be associated with a z-axis position value of 835.24 and hit bar B 512 may be associated with a z-axis position value of 692.87. Note that the z-axis position values are dependent upon several factors, including the coordinate system, virtual camera settings and units used in the user interface software package. These z-axis values correspond to the pixel offset values for the pixels, such that a z-axis position value of 692.87 is the same as a pixel offset value of 12.00 pixels. Similarly, a z-axis position value of 835.24 may be the same as a pixel offset value of 16.50 pixels. In this manner, the same depth may be identified in the output image 550 through either the pixel offset value or z-axis position value. Regardless of how the depth value is obtained, each pixel of the output image includes a depth value that maps to a corresponding stereoscopic 3-D frame such that the depth value for one or more pixels may be selected by the hit bars 510, 512 of the user interface 500.

As described, the embodiment shown in FIG. 5 includes two hit bars 510, 512 such that the pixels identified by hit bar B 512 are identified by the dashed lines and dotted areas while those pixels identified by hit bar A 510 are identified by the hashed area. In particular, pixels that define a portion 552 of the first character 516 are identified by hit bar A 510, as shown by the hashed area of the front of the character. Thus, the pixels defined by the hashed area 552 are perceived to be located at the same depth in the foreground of a corresponding stereoscopic frame. Further, the hit depth value defined by the text box 524 associated with hit bar A is 16.50. As described, a higher depth value associated with a hit bar identifies those pixels with a perceived position further into the foreground or background of the stereoscopic frame. Thus, because the hit depth value of hit bar A 510 is larger than the hit depth value of hit bar B 512, the pixels 552 identified or colored by hit bar A appear further into the foreground (or nearer the viewer) of the stereoscopic frame than those pixels identified or colored by hit bar B. In this manner, a user may utilize the hit bars 510, 512 of the user interface 500 to visually determine the location of any single pixel or group of pixels of the output image 550 in relation to one or more other pixels of the image. In other words, the hit bars 510, 512 of the user interface 500 may be utilized to create a bounding volume to verify the perceived distance between two objects of the corresponding stereoscopic frame.

In the example shown, a user may determine that the pixels in the hashed area 552 in response to hit bar A 510 appear further into the foreground (or closer to the viewer of the stereoscopic frame) than those pixels that are identified in response to hit bar B 512. Focusing on the first character 516, the user can thus determine that the middle portion 552 of the character appears closer to the viewer than the character's head or arms, as some pixels that define the head and arms are identified by the dashed line. Thus, when the character 516 is viewed stereoscopically, the character may appear to have volume to the viewer. This volume effect can be verified by a user of the user interface 500 through the utilization of the hit bars 510, 512 of the user interface 500.

Several other tools related to the hit bars 510, 512 may also be included in the user interface 500. For example, in one embodiment, the depth value text boxes 522, 524 allow a user to define a range of depths, rather than one depth value. For example, a depth value of a hit bar may define a range of all pixels with depth values between 10 and 11. Thus, in this embodiment, each pixel of the output image that has a depth value between 10 and 11 is colored or identified by the hit bar in a similar manner described herein. In another embodiment, the user interface may include a slide bar control 526. The slide bar control 526 is associated with one or more hit bars 510, 512 to manually adjust the depth value of the hit bar to adjust the pixels that each hit bar identified in the output image 550. For example, a user may utilize a mouse or keyboard of the computing device to slide an indicator 528 right or left along the slide bar control 526. In response, the depth value of a hit bar may adjust upward or downward accordingly, such that the hit bar highlights or identifies a higher or lower depth value for that hit bar. In this manner, a user may utilize the slide bar control 526 to move the depth-indicated colored pixels in the output image 550 along the perceptual z-axis of the displayed frame, moving from the foreground of the stereoscopic frame to the background, or vice versa. Thus, the user may visually determine the depth location of the objects of a stereoscopic frame to verify that the frame appears as intended.

The user interface 500 of FIG. 5 also includes a mode selector 514 that allows the user to select the mode in which the output image 550 is displayed in the image panel 502. In the example shown in FIG. 5, mode 0000 is selected. In this mode, the output image 550 is presented similar to the original 2-D frame, including all of the color values of the original 2-D frame with no depth cues provided other than the hit bars, as described. Generally, mode 0000 provides an output image that reproduces the frame that is seen by the viewer, with additional hit bar indicators as described herein. However, other modes may be selected that display the output image 550 with some depth indicator for each or some of the pixels of the image. An alternate viewing mode may be selected through an input provided by the user, such as a selection of a mode from a drop down menu or by typing in the desired mode.

Figure 6:
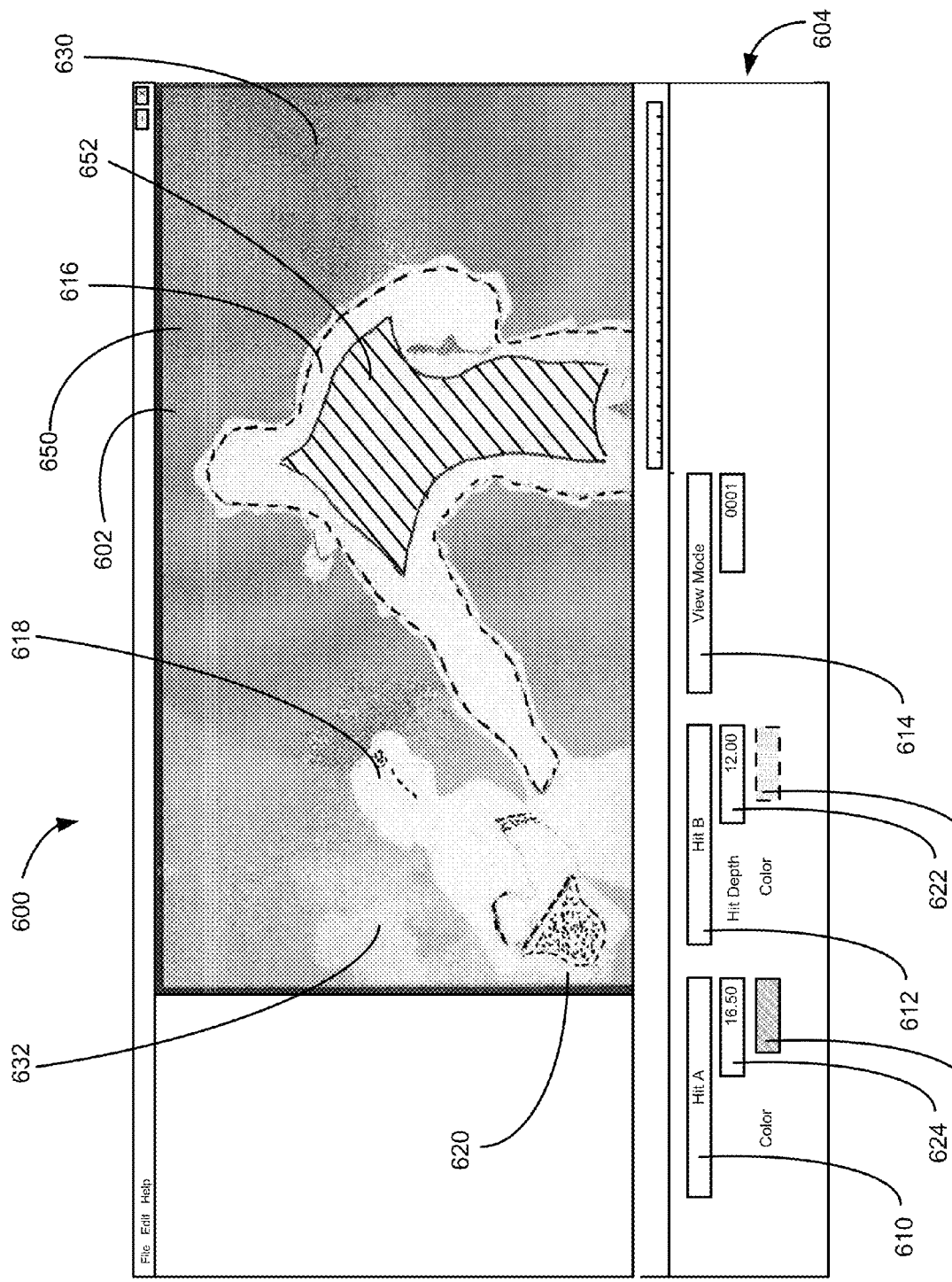
FIG. 6 is a diagram illustrating a user interface providing an altered frame of a multimedia presentation to illustrate the perceived depth of each pixel of the frame.

FIG. 6 is a diagram illustrating the user interface displaying a second viewing mode for the frame. In this mode, the output image 650 of the frame includes depth information for each pixel of the output image. Several of the features of the user interface of FIG. 6 are similar to the features of the interface shown in FIG. 5, including a hit bar A 610 with corresponding hit depth text box 624 and identification box or color swatch 626, a hit bar B 612 with corresponding hit depth text box 622 and identification box or color swatch 628, an image panel 602, and a control panel 604. Further, the output image 650 displayed in the image panel 602 is similar to the output image 550 of FIG. 5. However, in this viewing mode, the pixels of the output image 650 are presented with a grayscale value that indicates the depth value associated with each pixel.

Figure 7A:
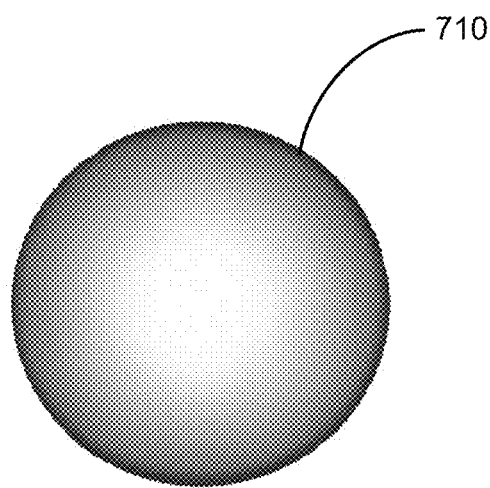
FIG. 7A is a diagram illustrating one example of a gray scale template indicating depth for a generally circular object a stereoscopic frame.
Figure 7B:
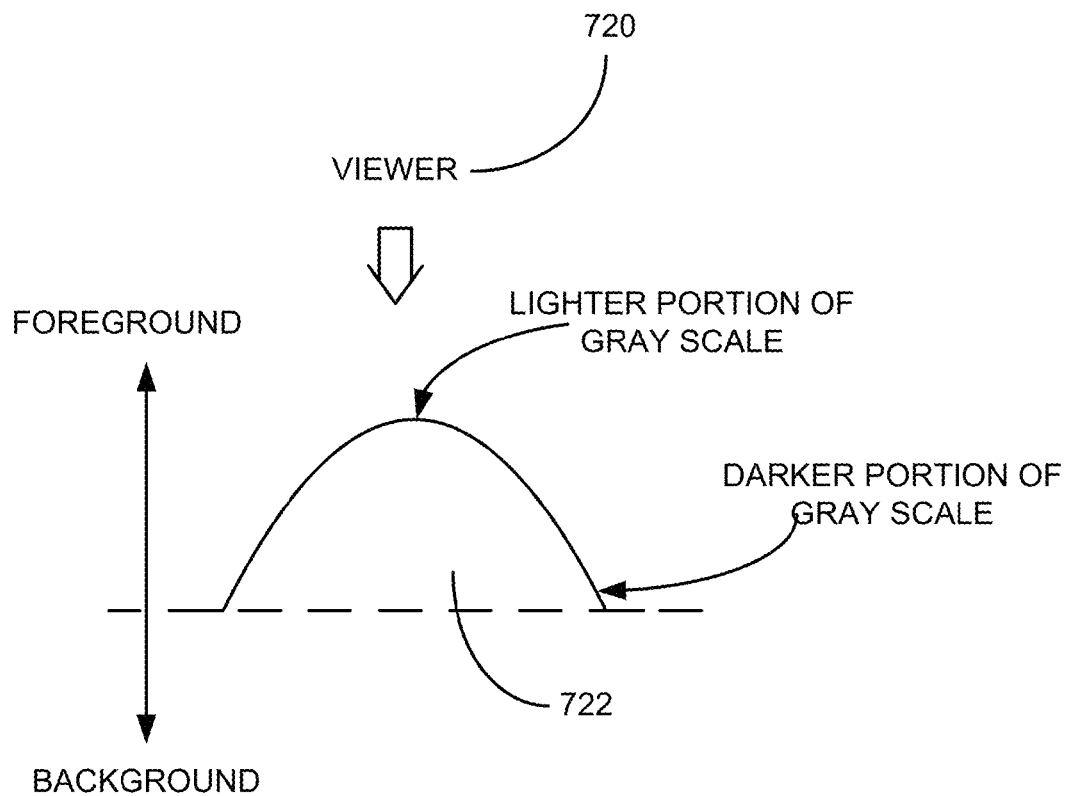
FIG. 7B is a diagram illustrating the volume effect of the gray scale template an the object of the stereoscopic frame.

The selected mode shown in FIG. 6 provides an output image 650 of the frame, including each layer of the frame. However, in this viewing mode, each pixel of the output image 650 is shaded with a grayscale value to indicate the perceived position of the pixel in the corresponding 3-D stereoscopic image. The association of the gray scale value of a pixel to the perceived depth position of that pixel in the corresponding 3-D stereoscopic image is best understood in relation to FIGS. 7A and 7B. FIG. 7A is a diagram illustrating one example of a gray scale template indicating depth for a generally circular object a stereoscopic frame. FIG. 7B is a top view of the perceived volume of the round object of the 2-D layer corresponding to the gray scale template set out in FIG. 7A. Thus, to a viewer 720 of the stereoscopic 3-D frame, the object appears to extend into the foreground of the 3-D frame. As should be appreciated, the diagram of 7B is merely an illustration of the stereoscopic volume of an object. The object does not physically extend into the foreground of frame, but only appears as such when the left eye and right eye layers of the 3-D frame are viewed by the viewer.

As shown, the object 722, after application of the gray scale template, appears to the viewer 720 to have a stereoscopic 3-D volume that is based on the gradient model 710 provided in FIG. 7A. In this example, the whiter portions of the gradient model 710 correspond to the center of the object while the darker portions of the gradient model map to the edges of the round object. Further, based on the shades of the gradient model 710, the pixels of the object that correspond to the whiter portions of the gradient model may have a greater pixel offset than that of the pixels of the object that correspond to the darker portions of the gradient model, with each shade of gray between the white and dark portions receiving a sliding scale of pixel offsets. Thus, a pixel offset for each pixel of the round object may be determined based on the shades of gray contained within the template 710. Further, the larger the pixel offset the further into the foreground or background the pixel may be perceived in the 3-D frame. Thus, when the object 722 is rendered in stereoscopic 3-D, the center of the object (with larger pixel offsets) may appear further in the foreground of the stereoscopic 3-D frame when compared to the edges of the object (with smaller pixel offsets). In this manner, each pixel of the object may correspond to a shade of gray in the gray scale template and have an associated pixel offset that is based on the shade of gray for that particular pixel to provide the object with the appearance of stereoscopic volume or depth. It should be appreciated that, although the gray scale template of FIG. 7A is applied to a single object of a stereoscopic frame, the same gray scale template may be applied to the entire stereoscopic frame. Thus, in this embodiment, those pixels that appear in the foreground of the stereoscopic frame are white in color while those pixels that appear in the background of the frame are darker in color. In essence, the gray scale template described herein may provide depth information for an object of a stereoscopic frame or an entire stereoscopic scene comprised of several objects.

Returning to FIG. 6, the gray scale template described herein is applied to the stereoscopic frame shown in the user interface 600. Particularly, the pixels of the stereoscopic frame that are located in the foreground have a white shade to them. Thus, because the first character 616 and the second character 618 are shown in pixels that are white or near white in the output image, these characters appear near the viewer in the corresponding stereoscopic frame. The further into the background of the stereoscopic frame that a pixel appears, the darker shade of gray the pixel will have in the corresponding output image 650. Thus, as shown in image panel 602, the pixels of the right side 630 of the output image 650 are darker in color, indicating that the pixels of the stereoscopic frame that correspond to these pixels appear in the background of the frame. Further, when viewed stereoscopically, these pixels appear further in the background than the characters 616, 618 of the frame. In addition, the pixels that define a third character 632 are colored a shade of gray that lies somewhere between the white shading of the first character 616 and the darker background pixels 630. Therefore, the gray shading of these pixels indicate that the third character 632, when viewed stereoscopically, appears between the first character 616 and the background pixels 630. In this manner, the second viewing mode indicates to the user of the interface 600 the perceived depth or depth values of the pixels of the output image 650. The user may then visualize the depth of each of the layers and/or objects of the corresponding stereoscopic 3-D frame to determine if the frame, relative to itself or to each other, appears as desired.

To apply the grayscale values to the pixels of the output image 650, the computer system first determines the extreme z-axis positions for the corresponding stereoscopic 3-D frame. For example, the output image 650 may include one or more layers of a stereoscopic frame, with each layer having an associated z-axis position. Thus, one or more layers may be perceived in the background of the stereoscopic frame with an associated negative z-axis position. Similarly, one or more layers may be perceived in the foreground of the stereoscopic frame with an associated positive z-axis position. Such z-axis positions may be accomplished by providing a pixel offset to the left eye and right eye versions of the particular layers of the stereoscopic frame. Therefore, a composite output image 650 that includes the layers of the stereoscopic frame encompasses a range of z-axis values. These values may be utilized by the computing system to create the grayscale values for the pixels of the output image 650 that correspond to the perceived depth of the pixels in the stereoscopic frame. In one embodiment, the computer system utilizes the extreme negative z-axis value and the extreme positive z-axis value to normalize the depth values of the pixels of the output image 650 between these two extremes. For example, the computer may assign the extreme positive z-axis value as a one and the extreme negative z-axis value as a zero and assign the z-axis value of each pixel of the output image 650 as some non-integer value between one and zero. However, while the depth values in this embodiment are normalized between zero and one, any range of numerical values may be used to normalize the depth values within the output image 650. For example, another embodiment may assign the extreme positive z-axis value as 255 and the extreme negative z-axis value as a zero and assign the z-axis value of each pixel of the output image 650 as some value between 255 and zero. Further, in some embodiments, the extreme positive z-axis value may be zero and the extreme negative z-axis value may be a negative one. Generally, the values that define the normalized range for the z-axis values may be any numerical values.

Once the normalized depth values for the pixels of the output image 650 are determined, a gray scale value may be associated with each depth value to indicate the depth of the pixels of the corresponding stereoscopic frame. For example, the extreme far pixels (those pixels located at the extreme negative z-axis position in the background of the stereoscopic frame) are absolute or near absolute black in color while the extreme near pixels (those pixels located at the extreme positive z-axis position in the foreground of the stereoscopic frame) are absolute white or near absolute white in color. Further, the pixels with depth values that lie between the extreme near pixels and the extreme far pixels are then colored with a gray scale value between black and white in accordance with the depth value of the pixel. For example, those pixels that are in the foreground of the frame are generally whiter in shade than those pixels that appear in the background of the frame. In this manner, the gray scale value applied to any one pixel of the output image 650 corresponds to a normalized depth value for that pixel in the corresponding stereoscopic frame.

While the pixels of the output image 650 are shown with varying degrees of shades of gray to indicate the position of the pixel along the perceptual z-axis of a corresponding stereoscopic frame, the pixels may also utilize color to provide the depth indication. In one embodiment, a color shading scale similar to the gray scale is used to provide depth information. For example, a blue scale shading scheme may be used to indicate the depth of the pixels such that those pixels that are a solid blue are farthest in the background of the stereoscopic frame and those pixels that are closer to white in color are in the foreground. In another embodiment, a color indicator is applied to the gray scale to provide an additional visual cue as to the depth placement of the pixels of the stereoscopic frame. For example, pixels that appear in the background of the corresponding stereoscopic frame are shaded with a red color and pixels that appear in the foreground are shaded with a blue color. Here, a viewer easily identifies features in front of the screen plane as blue and features visually behind the screen plane as red. Those pixels that appear at the screen plane (or zero z-axis position, no x-axis pixel offset between the left eye and right eye versions of the stereoscopic frame) receive no color tint. Generally, any color or combination of colors may be used to indicate foreground or background location of the pixel. These colors are added to the gray scale already applied to the output image to present a visual cue as to the foreground or background placement of the pixels of the corresponding stereoscopic frame.

In addition to the shading of each pixel of the frame in relation to the perceived depth, the hit bars 610-612 may also be included in the output image 650. The hit bars 610-612 generally operate as described in relation to FIG. 5. Thus, as shown in FIG. 6, several pixels of a first character 616, a second character 618 and an object 620 are identified by a dash line and dotted areas in response to the hit bar B 612. In embodiments using color, several hit bars may be utilized to identify several groups of pixels that correlate to the hit depths described by the hit bars, similar to FIG. 5. In addition, all functionality, such as depth ranges and slide control, may also be included with the hit bar functionality of the user interface 600 of FIG. 6.

Figure 8:
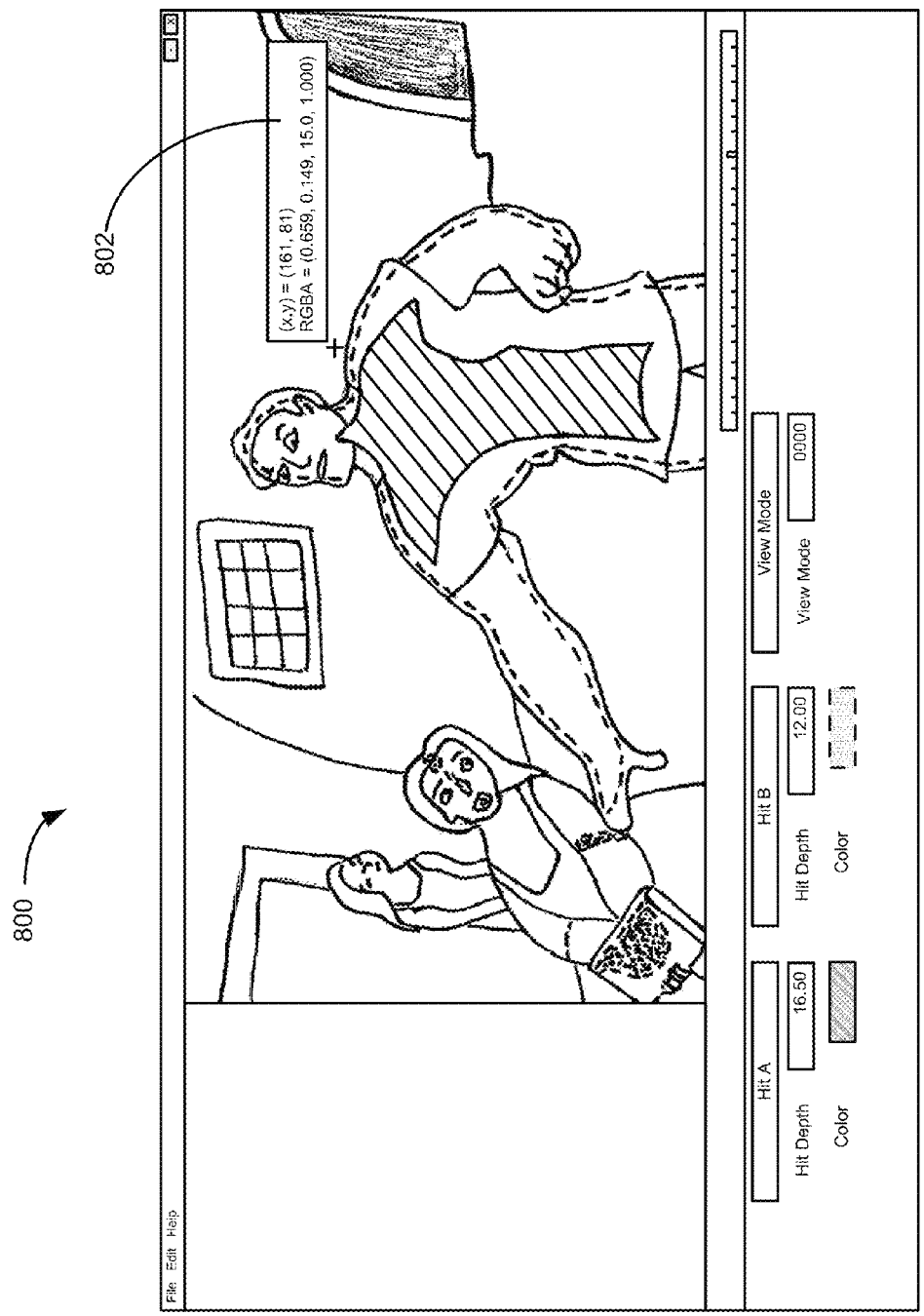
FIG. 8 is a diagram illustrating a user interface providing a pixel information viewing tool to illustrate the perceived depth of each pixel of a multimedia presentation frame.

By selecting different viewing modes, the output image 650 displayed to the user may be altered to provide different views of the output image and provide depth information to the user. For example, one mode may only display the frame with the shaded pixels, removing the hit bar functionality. In another mode, such as that shown in FIG. 6, the shaded pixels and the hit bar functionality may be combined. In still another viewing mode, shown in FIG. 8, the depth value is provided in one of several channels that define the pixels of the output image. For example, the depth information may be encoded in the blue channel of the displayed image. In this example, the user may utilize a pixel information viewing tool 802 of the user interface 800 to select to view the blue channel of the image to retrieve the depth information stored in that channel. However, because the depth information is typically outside the visible color range for the blue channel of the output image, the blue color would likely not provide a visual cue to the user of the interface as to the depth of the pixels of the output image. Rather, the depth information may not be apparent to the user of the interface until such information is obtained by the user through the pixel information viewing tool 802. Similarly, rather than embedding the depth information in one of the color channels of the output image, the interface may encode the depth information into a non-color channel such as a specific z-channel, alpha channel or other newly defined channel associated with the pixels of the output image. Generally, in this viewing mode, the depth information may be embedded in any channel of the pixels of the output image that is accessible by the user.

Figure 9:
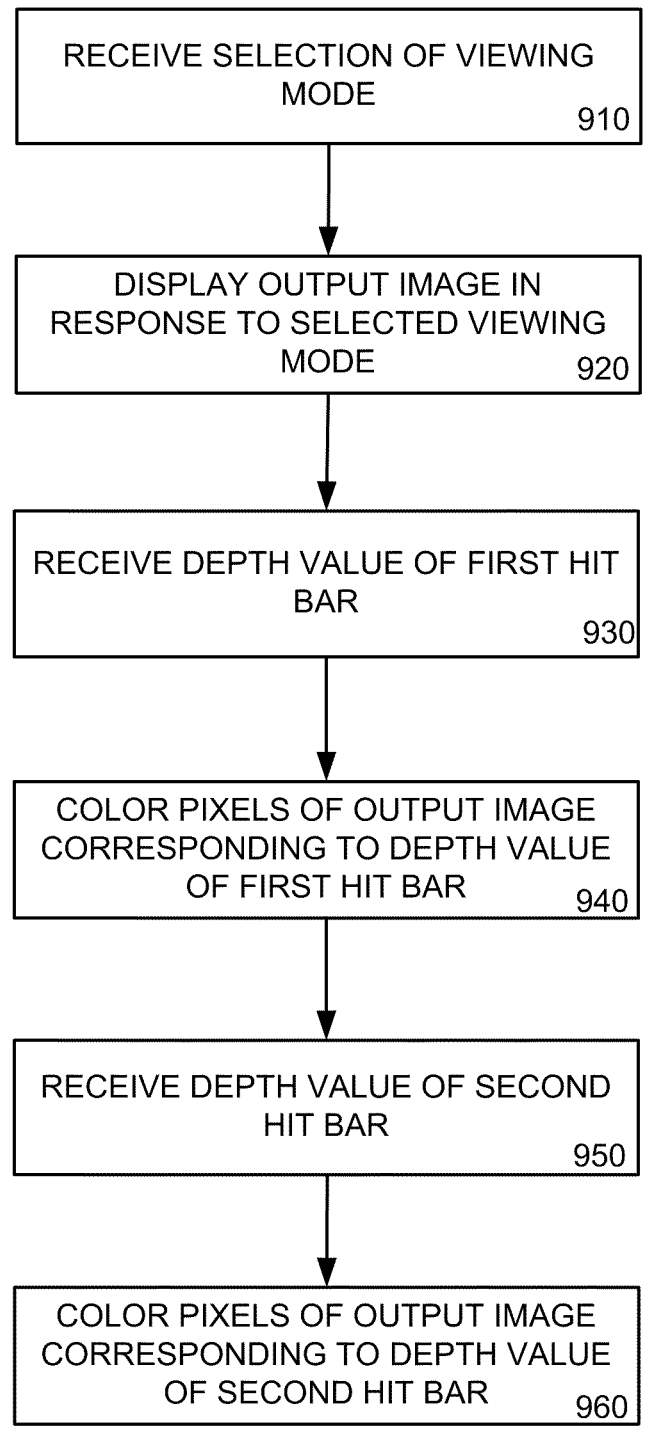
FIG. 9 is a flowchart of a method for utilizing a user interface to provide to a user perceived depth information of a stereoscopic 3-D image that corresponds to a 2-D image of a multimedia presentation.

FIG. 9 is a flowchart of a method for utilizing a user interface to provide to a user perceived depth information of a stereoscopic 3-D image that corresponds to a 2-D image of a multimedia presentation. In one embodiment, the operations are performed by one or more computer systems as part of a process to convert one or more 2-D images to stereoscopic 3-D images.

Beginning in operation 910, the computer system receives a selection of the viewing mode. The viewing mode determines how the depth information of the frame is displayed to the user. As described, the viewing mode may include, among others, depth information displayed through a gray scale shading of the pixels of the frame or by providing the information on a specific channel of the frame or may not include depth information at all.

In operation 920, the computer system displays an output image corresponding to the frame based on the selected viewing mode. Thus, the output image may be a copy of the frame or an image that corresponds to the frame that includes depth information for the pixels of the image. Once displayed, the computer system may receive a depth value for a first hit bar. As described, the depth value may be provided to the computer system by a user through an input device, such as a keyboard or mouse. In other embodiments, the user may select a pixel within the output image, the value of which is selected as the depth value for the first hit bar.

Once the depth value is selected, the computer system colors the pixels of output image that correspond to the selected depth value in operation 940. As described, the depth value corresponds to a pixel offset or z-axis position of a pixel of the frame. Thus, in operation 940, each pixel of the frame that has the same depth value as the selected depth value is colored in the output image. In one embodiment, the pixels are colored in a solid black or solid white. In other embodiments, the pixels of that depth value are colored using a solid color to distinguish and identify those pixels as being located at the selected depth.

A second hit bar may be utilized by a user of the computer system in operations 950 and 960. Thus, in operation 950, a second depth value is received that corresponds to a second hit bar. In operation 960, the pixels of the frame that correspond to the second depth value are colored in the output image, similar to operation 940. In this manner, the depth information for a stereoscopic 3-D image that corresponds to the displayed layer may be provided to a user of the computer system for use in converting the 2-D image into a corresponding 3-D stereoscopic image. A given embodiment may include additional hit bars.

Figure 10:
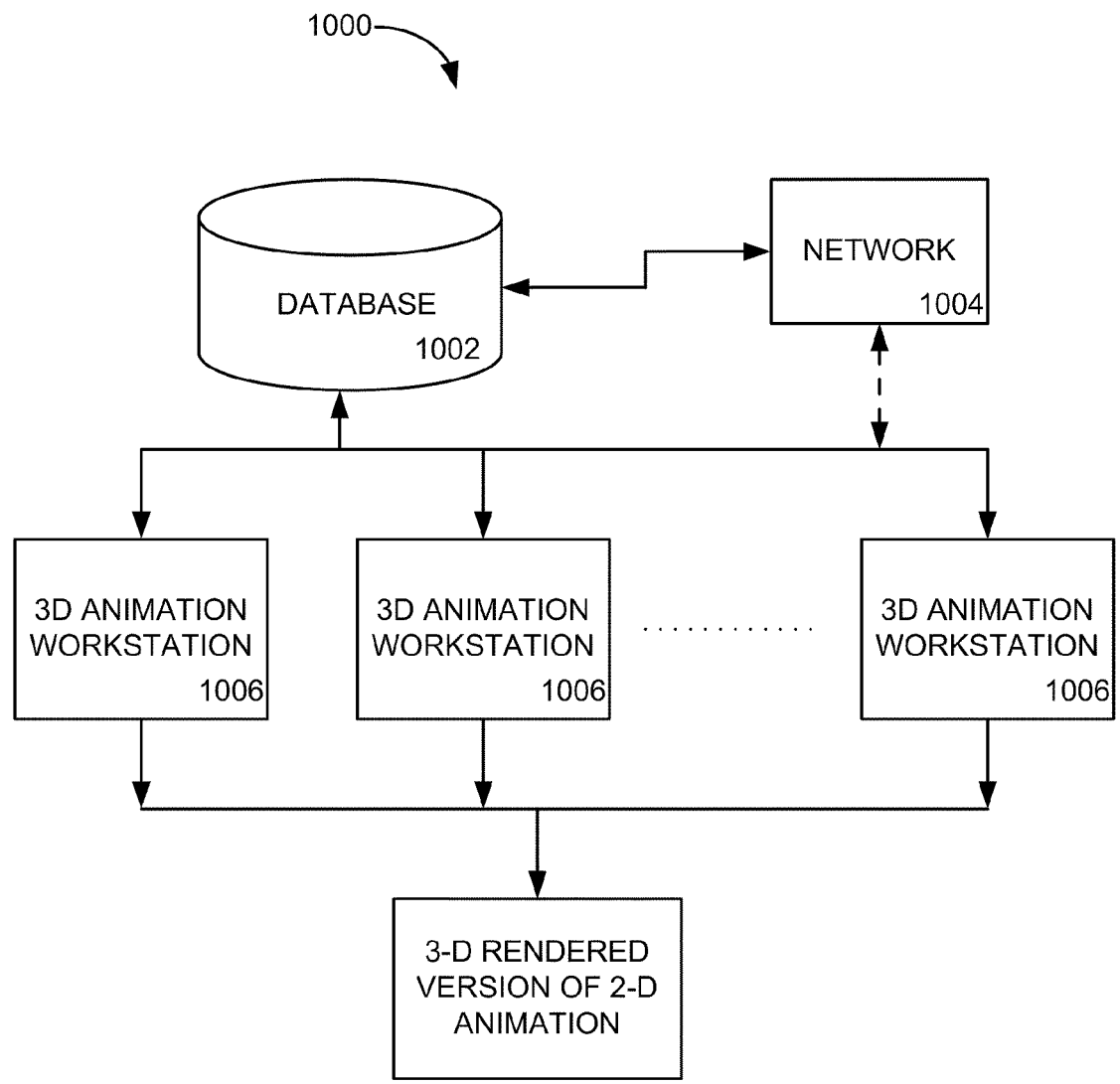
FIG. 10 is a block diagram illustrating a particular system for converting a 2-D image of a multimedia presentation to a 3-D image and presenting a user interface for providing depth information of the stereoscopic 3-D image.

FIG. 10 is a high-level block diagram illustrating a particular system 1000 for presenting a user interface to a user that provides depth information of stereoscopic 3-D frame corresponding to a 2-D frame. The system described below may perform one or more of the operations described above with reference to FIGS. 1 and 8.

The system 1000 may include a database 1002 to store one or more scanned or digitally created layers for each image of the multimedia presentation. In one embodiment, the database 1002 may be sufficiently large to store the many layers of an animated feature film. Generally, however, the database 1002 may be any machine readable medium. A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory. Common forms of machine-readable medium may include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Alternatively, the layers of the 2-D images may be stored on a network 1004 that is accessible by the database 1002 through a network connection. The network 1004 may comprise one or more servers, routers and databases, among other components to store the image layers and provide access to such layers. Other embodiments may remove the database from the system 1000 and extract the various layers from the 2-D image directly by utilizing the one or more computing systems.

The system 1000 may also include one or more computing systems 1006 to perform the various operations to convert the 2-D images of the multimedia presentation to stereoscopic 3-D images. Such computing systems 1006 may include workstations, personal computers, or any type of computing device, including a combination therein. Such computer systems 1006 may include several computing components, including but not limited to, one or more processors, memory components, I/O interfaces, network connections and display devices. Memory and machine-readable mediums of the computing systems 1006 may be used for storing information and instructions to be executed by the processors. Memory also may be used for storing temporary variables or other intermediate information during execution of instructions by the processors of the computing systems 1006. In addition, the computing systems 1006 may be associated with the database 1002 to access the stored image layers. In an alternate embodiment, the computing systems 1006 may also be connected to the network through a network connection to access the stored layers. The system set forth in FIG. 10 is but one possible example of a computer system that may employ or be configured in accordance with aspects of the present disclosure.

It should be noted that the flowcharts of FIGS. 1 and 9 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method of analyzing a stereoscopic image corresponding to a two dimensional digital image, the method comprising:
   obtaining a two dimensional digital image comprising a plurality of pixels and a stereo depth map, the plurality of pixels corresponding to the stereoscopic image and the two dimensional digital image, the stereo depth map corresponding to the stereoscopic image and including depth values for the plurality of pixels of the two dimensional digital image;
   receiving a selection of a first depth value included in the stereo depth map;
   identifying, by a processor, pixels of the two dimensional digital image associated with the first depth value;
   shading the non-identified pixels of the two dimensional digital image based on the stereo depth map;
   applying, by the processor, a first pixel color to distinguish the identified pixels corresponding to the particular depth value;
   receiving a selection of a second depth value included in the stereo depth map;
   identifying, by the processor, each pixel in the two dimensional digital image associated with the second depth value; and
   applying, by the processor, a second pixel color to all of the identified pixels in the two dimensional digital image, wherein the second pixel color is different than the first pixel color.

2. The method of claim 1 further comprising:
   coloring the non-identified pixels of the two dimensional digital image a base depth color.

3. The method of claim 2 wherein a lighter shade of the base color corresponds to a higher depth value in the stereo depth map and a darker shade of the base color corresponds to a lesser depth value in the stereo depth map.

4. The method of claim 1 further comprising:
applying a first shade color to those shaded pixels that correspond to the background of the stereoscopic image; and
applying a second shade color to those shaded pixels that correspond to the foreground of the stereoscopic image.

5. The method of claim 1 wherein the first depth value comprises a range of depth values included in the stereo depth map.

6. The method of claim 1 wherein identifying the first depth value comprises:
receiving the first depth value from an input device.

7. The method of claim 1 further comprising:
storing the depth values for the plurality of pixels in one of a plurality of channels that define the plurality of pixels of the two dimensional digital image.

8. A non-transitory machine-readable storage medium, the machine-readable storage medium storing a machine-executable code that, when executed by a computer, causes the computer to perform the operations of:
displaying a user interface comprising an image panel configured to display a two dimensional digital image, the two dimensional digital image including at least one stereo depth map indicating a plurality of depth values for one or more pixels of the two dimensional digital image, the one or more pixels corresponding to a stereoscopic image and the two dimensional digital image, the stereo depth map corresponding to the stereoscopic image;
receiving a selection of a first selected depth value from an input device;
identifying by a processor all pixels of the two dimensional digital image having a depth value within a range defined by the first selected depth value;
generating by the processor a first region based on the identifying of all pixels, the first region retaining the shape of the identified pixels;
applying a first pixel color to all of the pixels of the first region;
displaying the first region in place of the identified pixels of the two dimensional digital image;
shading the pixels of the two dimensional digital image based on the at least one stereo depth map, wherein the shading is separate from the first color
receiving a selection of a second selected depth value from the input device;
identifying all pixels of the two dimensional digital image having a depth value within a range defined by the second selected depth value;
generating a second region based on the identifying of all pixels within the range defined by the second selected depth value, the second region retaining the shape of the identified pixels; and
applying a second pixel color to all of the pixels of the second region, wherein the second pixel color is different than the first pixel color.

9. The non-transitory machine-readable storage medium of claim 8, wherein the machine-readable code further causes the computer to perform the operations of:
displaying the second region in place of the identified pixels of the two dimensional digital image.

10. The non-transitory machine-readable storage medium of claim 8, wherein the machine-readable code further causes the computer to perform the operations of:
storing the depth values for the plurality of pixels in one of a plurality of channels that define the plurality of pixels of the two dimensional digital image.

11. The non-transitory machine-readable storage medium of claim 8, wherein the shading operation comprises:
coloring the non-identified pixels of the two dimensional digital image a base depth color.

12. The non-transitory machine-readable storage medium of claim 11, wherein a lighter shade of the base color corresponds to a higher depth value in the at least one stereo depth map and a darker shade of the base color corresponds to a lesser depth value in the at least one stereo depth map.

13. A system for analyzing a stereoscopic frame comprising:
a storage medium configured to store a two dimensional frame comprising a plurality of pixels, each two dimensional frame including at least one associated stereo depth map maintaining a depth value for one or more of the plurality of pixels, the plurality of pixels corresponding to a stereoscopic image and a two dimensional digital image, the stereo depth map corresponding to the stereoscopic image; and
one or more computing systems associated with the storage medium and in communication with a display device;
wherein the one or more computing systems include a computer-executable code that, when executed by the one or more computing systems, causes the one or more computing systems to perform the operations of:
receiving a selection of a first stereoscopic depth value input;
analyzing by the processor the stereo depth map for the two dimensional frame to identify depth values of the two dimensional frame;
identifying by a processor all pixels of the plurality of pixels having a first depth value within a range defined by the first stereoscopic depth value input;
generating a first region based on the identifying of all pixels, the first region retaining the shape of the identified pixels;
applying an identifying characteristic to all of the pixels of the first region;
displaying the first region in place of the identified pixels in the two dimensional frame;
receiving a selection of a second selected depth value from the input device;
identifying all pixels of the two dimensional digital image having a depth value within a range defined by the second selected depth value;
generating a second region based on the identifying of all pixels within the range defined by the second selected depth value, the second region retaining the shape of the identified pixels;
applying a second pixel color to all of the pixels of the second region; and
shading the non-identified pixels corresponding to a plurality of depth values from the stereo depth map.

14. The system of claim 13 further comprising:
a network configured to access the two dimensional frame, wherein the storage medium is further configured to retrieve the two dimensional frame from the network.

15. The system of claim 13 wherein the one or more computing systems further comprise a network connection, the one or more computing systems further configured to retrieve the two dimensional frame from a network through the network connection.

16. The system of claim 13 further comprising:
an input device for providing the stereoscopic depth value input.

17. The system of claim 13 wherein the shading operation comprises
- generating a gray scale version of the two dimensional frame wherein the gray scale value for each pixel of the gray scale version corresponds to the depth value for the plurality of pixels in the at least one associated stereo depth map; and
- displaying the gray scale version on the display device.

18. The method of claim 1, wherein the shading operation further comprises shading the identified pixels based on the stereo depth map a plurality of shade colors, wherein each of the shade colors has a same base hue
- wherein the first pixel color is different from the base hue.

19. The method of claim 1, wherein the shading operation further comprises:
- shading the identified pixels based on the stereo depth map a plurality of shades, wherein each of the shades correspond to a different depth value.

* * * * *